US008842971B2

(12) United States Patent
Pontual et al.

(10) Patent No.: US 8,842,971 B2
(45) Date of Patent: Sep. 23, 2014

(54) METHODS AND APPARATUS TO PRESENT AUDIO AND VIDEO AT NON-NATIVE RATES

(75) Inventors: Romulo Pontual, Larchmont, NY (US); David P. Green, Castaic, CA (US); Tyson L. Wintibaugh, Marina del Rey, CA (US); Brian Black, Santa Monica, CA (US); Roger Lambert, Pacific Palisades, CA (US); Ajmair S. Heer, Irvine, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1200 days.

(21) Appl. No.: 11/831,074

(22) Filed: Jul. 31, 2007

(65) Prior Publication Data

US 2009/0037972 A1     Feb. 5, 2009

(51) Int. Cl.
*H04N 5/94*      (2006.01)
*H04N 9/88*      (2006.01)
*H04N 9/80*      (2006.01)
*H04N 5/783*     (2006.01)
*H04N 21/43*     (2011.01)
*H04N 21/4147*   (2011.01)
*H04N 21/432*    (2011.01)
*H04N 21/4402*   (2011.01)
*H04N 5/76*      (2006.01)
*H04N 5/907*     (2006.01)
*H04N 5/781*     (2006.01)
*H04N 5/85*      (2006.01)

(52) U.S. Cl.
CPC ............. *H04N 5/76* (2013.01); *H04N 21/4305* (2013.01); *H04N 21/4147* (2013.01); *H04N 5/907* (2013.01); *H04N 5/781* (2013.01); *H04N 21/4325* (2013.01); *H04N 5/783* (2013.01); *H04N 21/440281* (2013.01); *H04N 5/85* (2013.01)
USPC ............................ 386/263; 386/239; 386/343

(58) Field of Classification Search
USPC .................... 386/343–352, 239–24, 263–277
See application file for complete search history.

(56) References Cited

U.S. PATENT DOCUMENTS

| 5,430,485 | A * | 7/1995 | Lankford et al. | 348/423.1 |
| 2002/0150126 | A1 * | 10/2002 | Kovacevic | 370/503 |
| 2004/0086262 | A1 * | 5/2004 | Igawa et al. | 386/68 |
| 2006/0015348 | A1 * | 1/2006 | Cooper et al. | 704/500 |

OTHER PUBLICATIONS

Final Rejection dated Feb. 22, 2012 in U.S. Appl. No. 11/947,564, filed Nov. 29, 2007 by Robert G. Arsenault et al.

* cited by examiner

*Primary Examiner* — Hung Dang (57) ABSTRACT

Methods and apparatus to play audio and video content at non-native rates are described. An example method includes playing a video portion of audiovisual content at a non-native rate, playing an audio portion of the audiovisual content at the non-native rate to correspond with the video portion, wherein a presentation of the audiovisual content at the non-native rate and a presentation of the audiovisual content at a native rate are substantially indistinguishable to an audience.

25 Claims, 6 Drawing Sheets

| Presentation Time Stamp at Video Synchronization | 120% System Clock at Video Synchronization | Variation | Result |
|---|---|---|---|
| 0ms | 0ms | 0ms | Display Next Frame |
| 33.33ms | 40ms | 6.67ms | Display Next Frame |
| 66.67ms | 80ms | 13.33ms | Display Next Frame |
| 100.00ms | 120ms | 20.00ms | Drop Next Frame |
| 166.67ms | 160ms | -6.67ms | Display Next Frame |
| 200.00ms | 200ms | 0.00ms | Display Next Frame |
| 233.33ms | 240ms | 6.67ms | Display Next Frame |
| 266.67ms | 280ms | 13.33ms | Display Next Frame |
| 300.00ms | 320ms | 20.00ms | Drop Next Frame |
| 366.67ms | 360ms | -6.67ms | Display Next Frame |
| 400.00ms | 400ms | 0ms | Display Next Frame |
| 433.33ms | 440ms | 6.67ms | Display Next Frame |

METHODS AND APPARATUS TO PRESENT AUDIO AND VIDEO AT NON-NATIVE RATES

FIELD OF THE DISCLOSURE

The present disclosure relates generally to the digital recording, playing, and playback of audiovisual content. More particularly, it relates to methods and apparatus to present audio and video at non-native rates.

BACKGROUND

The emergence of digital broadcasting systems has given rise to Digital Video Recording (DVR) devices, which allow consumers to record and store a digital copy of programming content. Such digital devices give users the ability to store and replay a recording more efficiently and with richer features than their analog predecessors (e.g., VCRs).

Among the advantages of DVR devices lies the ability to implement improved trick-plays (e.g., pausing, rewinding, fast-forwarding, etc.) during playback. For example, a viewer can quickly switch between a rewind mode and a fast forward mode, or can "hop" forward or backward within a recorded program that is being displayed. Moreover, a viewer can rapidly change the speed of the rewinding or fast forwarding. The operations are designed to provide an improved ability to navigate through a recording. Typically, features such as hopping, fast forwarding, and rewinding through content have been intended to allow a viewer to skip undesired content.

DETAILED DESCRIPTION

The example methods and apparatus described herein may be used to play, or present, audiovisual data in a media presentation system such as, for example, a home entertainment system including a media signal decoder (e.g., a set-top-box, a receiver, etc.) and a television or other media presentation device (e.g., a computer monitor). In particular, an example implementation may be used to play audiovisual content (e.g., a television program) at a non-native rate (e.g., an increased or decreased rate), while maintaining the viewer's ability to perceive and comprehend the content (i.e., see and hear the content) as though it were being played at a native viewing rate (i.e., the intended or normal rate). The audiovisual content may include an entire program stored on a storage device (e.g., a hard disk drive as described further below), data stored in a short-term manner (e.g., the last 30 minutes of live programming), or live programming.

The example methods and apparatus described herein to present audiovisual data at non-native rates may be implemented in connection with any type of media broadcasting system including, for example, satellite broadcast systems, cable broadcast systems, radio frequency wave broadcast systems, etc. By way of illustration, an example broadcast system is described below in connection with FIG. 1 and an example receiver (e.g., set-top-boxes, broadcast signal decoders, etc.) is described in detail below in connection with FIG. 2. Further, while the following disclosure is made with respect to example DIRECTV® broadcast services and systems, it should be understood that many other delivery systems are readily applicable to the disclosed methods and apparatus. Such systems include wired or cable distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), and fiber optic networks.

Figure 1:
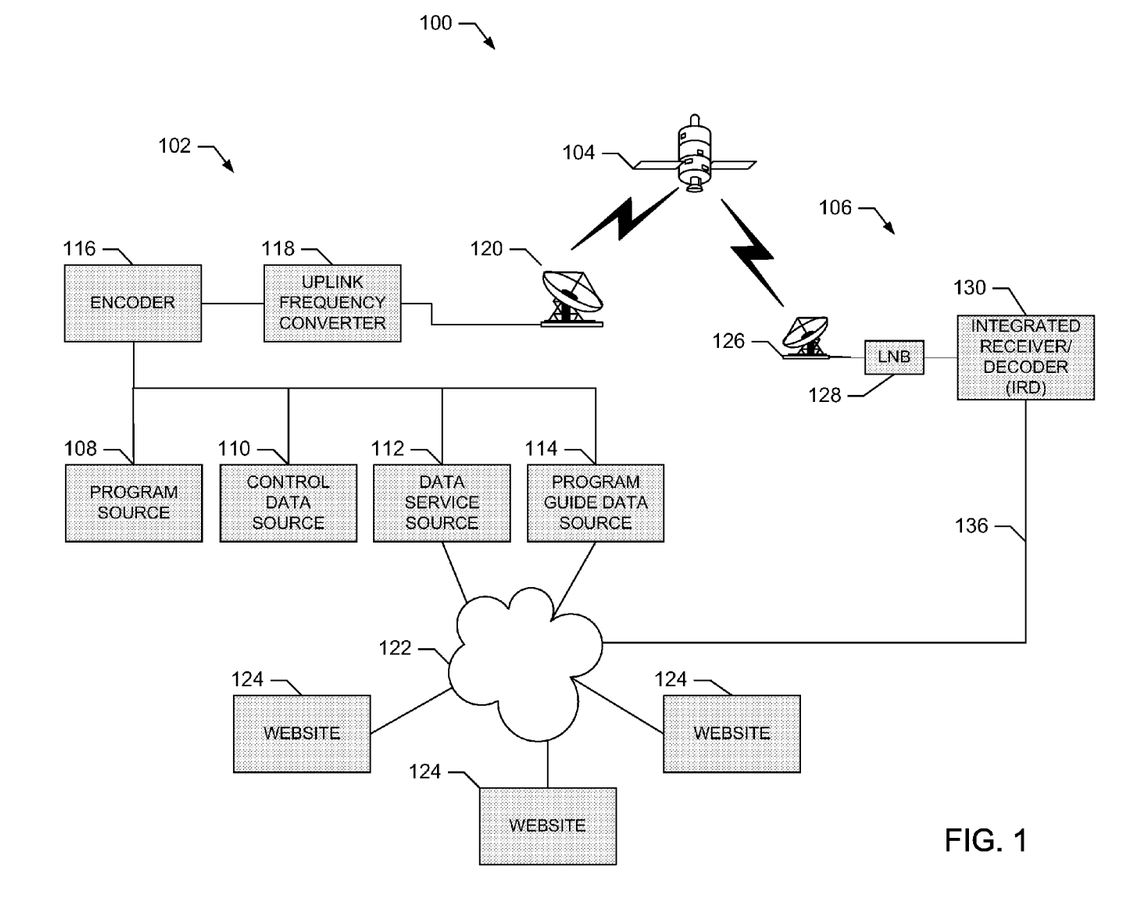
FIG. 1 is a diagram of an example direct-to-home (DTH) transmission and reception system.

As illustrated in FIG. 1, an example direct-to-home (DTH) system 100 generally includes a transmission station 102, a satellite/relay 104 and a plurality of receiver stations, one of which is shown at reference numeral 106, between which wireless communications are exchanged. The wireless communications may take place at any suitable frequency, such as, for example, Ku-band frequencies. As described in detail below with respect to each portion of the system 100, information from the transmission station 102 is transmitted to the satellite/relay 104, which may be at least one geosynchronous or geo-stationary satellite that, in turn, rebroadcasts the information over broad geographical areas on the earth that include receiver stations 106. To facilitate backchannel communications, the receiver stations 106 may be communicatively coupled to the transmission station 102 via a terrestrial communication link, such as a telephone line and/or an Internet connection 136.

In further detail, the example transmission station 102 of the example system of FIG. 1 includes a plurality of sources of data and/or information (e.g., program sources 108, a control data source 110, a data service source 112, and one or more program guide data sources 114). During operation, information from one or more of these sources 108-114 passes to an encoder 116, which encodes the information for broadcast to the satellite/relay 104. Encoding includes, for example, converting the information into data streams that are multiplexed into a packetized data stream or bitstream using any of a variety of algorithms. A header is attached to each data packet within the packetized data stream to facilitate identification of the contents of the data packet. The header also includes a service channel identifier (SCID) that identifies the data packet. This data packet is then encrypted. As will be readily appreciated by those having ordinary skill in the art, a SCID is one particular example of a program identifier (PID).

To facilitate the broadcast of information, the encoded information passes from the encoder 116 to an uplink frequency converter 118 that modulates a carrier wave with the encoded information and passes the modulated carrier wave to an uplink antenna 120, which broadcasts the information to the satellite/relay 104. Using any of a variety of techniques, the encoded bitstream is modulated and sent through the uplink frequency converter 118, which converts the modulated encoded bitstream to a frequency band suitable for reception by the satellite/relay 104. The modulated, encoded bitstream is then routed from the uplink frequency converter 118 to the uplink antenna 120 where it is broadcast toward the satellite/relay 104.

The programming sources 108 receive video and audio programming from a number of sources, including satellites, terrestrial fiber optics, cable, or tape. The video and audio programming may include, but is not limited to, television programming, movies, sporting events, news, music or any other desirable content.

Like the programming sources 108, the control data source 110 passes control data to the encoder 116. Control data may include data representative of a list of SCIDs to be used during the encoding process, or any other suitable information.

The data service source 112 receives data service information and web pages made up of text files, graphics, audio, video, software, etc. Such information may be provided via a network 122. In practice, the network 122 may be the Internet, a local area network (LAN), a wide area network (WAN) or a conventional public switched telephone network (PSTN). The information received from various sources is compiled by the data service source 112 and provided to the encoder 116. For example, the data service source 112 may request and receive information from one or more websites 124. The information from the websites 124 may be related to the program information provided to the encoder 116 by the program sources 108, thereby providing additional data related to programming content that may be displayed to a user at the receiver station 106.

The program guide data source 114 compiles information related to the SCIDs used by the encoder 116 to encode the data that is broadcast. For example, the program guide data source 114 includes information that the receiver stations 106 use to generate and display a program guide to a person (i.e., a user), wherein the program guide may be a grid guide that informs the user of particular programs that are available on particular channels at particular times. The program guide also includes information that the receiver stations 106 use to assemble programming for display to the user. For example, if the user desires to watch a baseball game on his or her receiver station 106, the user will tune to a channel on which the game is offered. As described in detail below, the receiver station 106 gathers the SCIDs related to the game, wherein the program guide data source 114 has previously provided to the receiver station 106 a list of SCIDs that correspond to the game.

The satellite/relay 104 receives the modulated, encoded Ku-band bitstream and re-broadcasts it downward toward an area on earth that includes the receiver station 106. In the illustrated example of FIG. 1, the example receiver station 106 includes a reception antenna 126 connected to a low-noise-block (LNB) 128 that is further connected to an integrated receiver/decoder (IRD) 130. The IRD 130 may be a set-top box, a personal computer (PC) having a receiver card installed therein, or any other suitable device.

Although not necessary for proper operation of the example system of FIG. 1, the receiver station 106 may optionally incorporate a connection 136 (e.g., Ethernet circuit or modem for communicating over the Internet) to the network 122 for transmitting requests and other data back to the transmission station 102 (or a device managing the transmission station 102 and overall flow of data in the example system 100) and for communicating with websites 124 to obtain information therefrom.

In operation of the receiver station 106, the reception antenna 126 receives signals including a bitstream from the satellite/relay 104. The signals are coupled from the reception antenna 126 to the LNB 128, which amplifies and, optionally, downconverts the received signals. The LNB output is then provided to the IRD 130.

Figure 2:
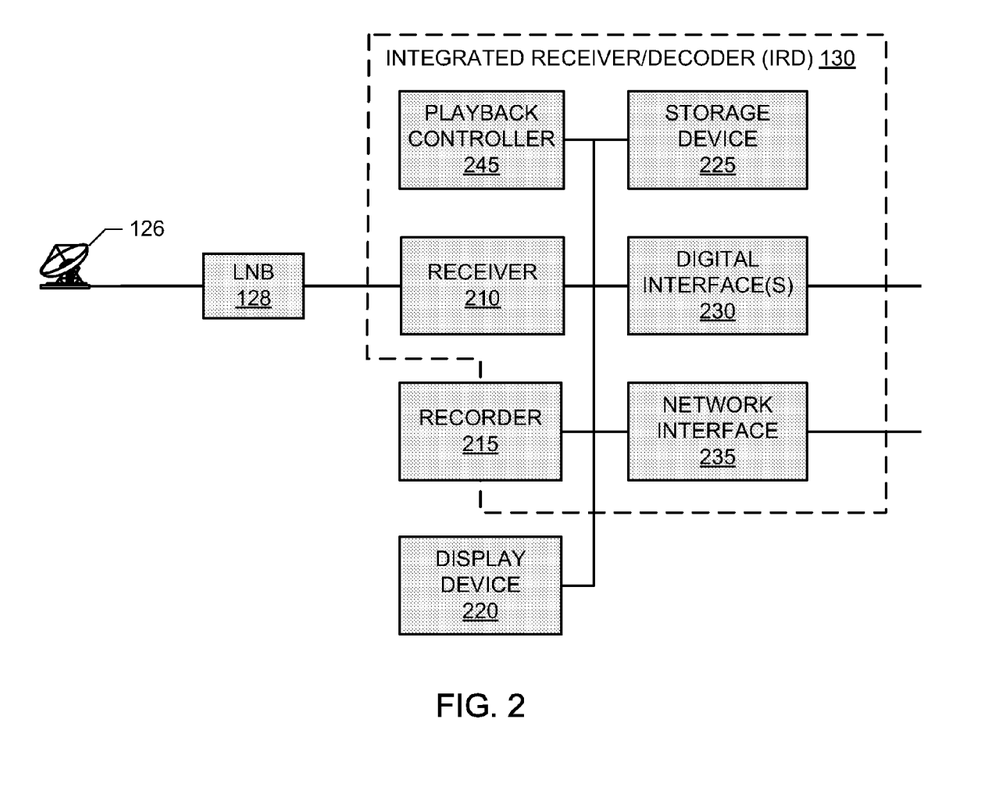
FIG. 2 illustrates an example manner of implementing the example integrated receiver/decoder (IRD) of FIG. 1.

FIG. 2 illustrates one example manner of implementing the IRD 130 (e.g., a set-top box) of FIG. 1; other example manners of implementing an IRD are possible, thus the IRD 130 of FIG. 2 is merely an example. The LNB output is provided to a receiver 210, which receives, demodulates, de-packetizes, de-multiplexes, decrypts and/or decodes the received signal to provide audio and video signals to a display device 220 (e.g., a television set or computer monitor) and/or a recorder 215. The receiver 210 is responsive to user inputs to, for example, tune to a particular program.

As illustrated in FIG. 2, the recorder 215 may be implemented separately from and/or within the IRD 130. The recorder 215 may be, for example, a device capable of recording information on a storage device 225, for instance, analog media such as videotape or computer readable digital media such as a hard disk drive, a digital versatile disc (DVD), a compact disc (CD), flash memory, and/or any other suitable media. The storage device 225 is used to store the packetized assets and/or programs received via the satellite/relay 104 of FIG. 1 (e.g., a television program). In particular, the packets stored on the storage device 225 are the same encoded and, optionally, encrypted packets created by the transmission station 102 of FIG. 1 and transmitted via the satellite/relay 104 of FIG. 1.

To communicate with any of a variety of clients, media players, etc., the illustrated example IRD 130 includes one or more digital interfaces 230 (e.g., USB, serial port, Firewire, etc.). To communicatively couple the example IRD 130 to, for instance, the Internet and/or a home network, the example IRD 130 includes a network interface 235 that implements, for example, an Ethernet interface.

To facilitate various playback features or options, the example IRD 130 includes a playback controller 245. The playback controller 245 may, for example, implement a non-native rate of play mode, which includes presenting audiovisual content at an increased or decreased rate, relative to a native rate, while maintaining the ability of an audience to perceive (i.e., see and hear) the content as though the content were being presented at the native viewing rate. A native rate is a rate at which the content was intended to be viewed (e.g., a default viewing rate). For example, a native rate may be the rate at which live programming is broadcast, displayed, and/or recorded. In contrast, content played at a non-native rate is a slightly extended or shortened version of the content. For example, a television program played at a native rate (e.g., 30 frames per second) may be presented in 30 minutes, while the same television program presented at an increased non-native rate (e.g., 34 frames per second) may be displayed in 26.5 minutes. Alternatively, a decreased non-native rate (e.g., 26 frames per second) may be used to extend the same program to 33.3 minutes. The decreased or increased non-native rate may be implemented on live programming that is continuously being cached (e.g., stored for a short period of time) or a stored recording of audiovisual content. In another example, a cached live program being played at the increased non-native rate may return to a native rate when the program reaches a live broadcast point.

Figure 3:
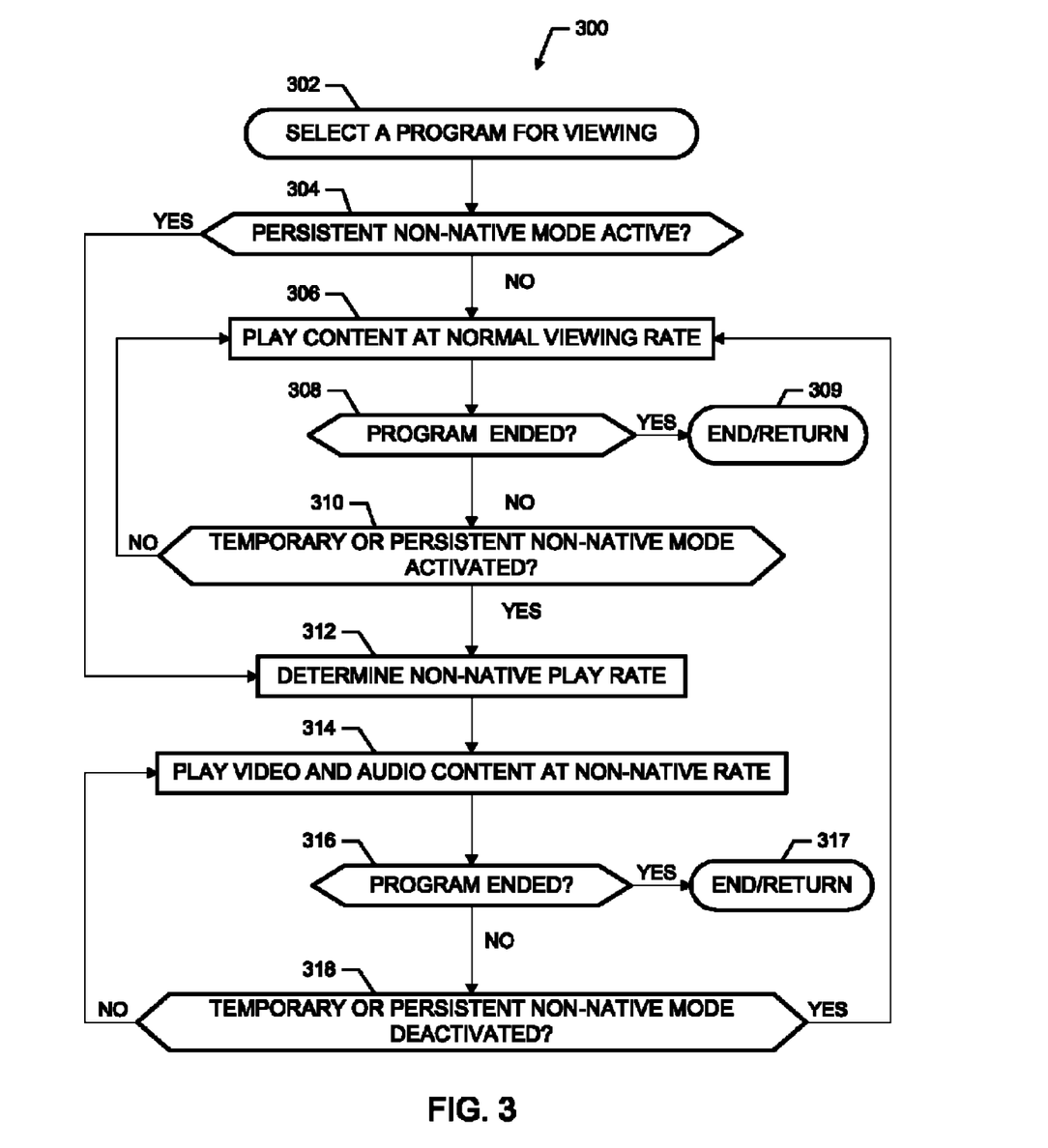
FIG. 3 is a flowchart representing an example process that may be performed by a media presentation system or device incorporating the example non-native rate of play mode described herein.

FIG. 3 illustrates an example process 300 that may be performed by a media presentation system (e.g., the media presentation system of FIGS. 1 and 2) incorporating (e.g., via the playback controller 245 of FIG. 2) an example non-native rate of play mode. Having described the architecture of one example system that may be used to transmit and present audiovisual content to an audience, various processes are described. Although the following discloses example processes through the use of flow diagrams having blocks, it should be noted that these processes may be implemented in any suitable manner. For example, the processes may be implemented using, among other components, software, or firmware executed on hardware. However, this is merely one example and it is contemplated that any form of logic may be used to implement the systems or subsystems disclosed herein. Logic may include, for example, implementations that are made exclusively in dedicated hardware (e.g., circuits, transistors, logic gates, hard-coded processors, programmable array logic (PAL), application-specific integrated circuits (ASICs), etc.) exclusively in software, exclusively in firmware, or some combination of hardware, firmware, and/or software. For example, instructions representing some or all of the blocks shown in the flow diagrams may be stored in one or more memories or other machine readable media, such as hard drives or the like (e.g., the memories 606 and/or 608 of FIG. 6). Such instructions, which may be executed by one or more processors (e.g., the processor 602 of FIG. 6), may be hard coded or may be alterable. Additionally, some portions of the processes may be carried out manually. Furthermore, while each of the processes described herein is shown in a particular order, those having ordinary skill in the art will readily recognize that such an ordering is merely one example and numerous other orders exist. Accordingly, while the following describes example processes, persons of ordinary skill in the art will readily appreciate that the examples are not the only way to implement such processes.

The process 300 begins with a user (e.g., a person viewing the media presentation system of FIGS. 1 and 2) selecting a program (e.g., a television program stored on the storage device 225 of FIG. 2 or a live broadcast) for viewing (block 302). The process 300 then determines if a persistent non-native mode is active (block 304). For example, the media presentation system may include a setting whereby all programming is viewed at a non-native rate until instructed otherwise. Such a setting may, for example, be set or changed by a user through an on-screen menu implemented in a receiver (e.g., the IRD of FIG. 2) or through a dedicated button(s) on a remote control or other input device. The user may choose to set the persistent non-native mode depending on the type of programming being viewed, other audience members' preferences, time constraints, etc. The persistent non-native mode may be set to view content at a non-native rate for an extended period of time and/or for the duration of a recording or live program. In other words, the persistent non-native mode may affect all programming and, moreover, may remain active after the receiver (or other media presentation device) is turned off and/or the program is over (e.g., terminated by the user or the entire content has been presented).

At block 304, when the persistent non-native mode is active, the process 300 then determines the setting or value of the non-native rate of play and proceeds to activate the same (described further below in connection with blocks 312 and 314). On the other hand, when the persistent non-native mode is not active, the process 300 presents the content at a native rate (block 306). The content may be presented at the native rate until interrupted, for example, by the end of the program (block 308). If the program ends (e.g., is terminated by the user or the entire content is played) the process 300 is over (block 309). The program may also be interrupted by the activation of a non-native mode (block 310). For example, the program may be interrupted by the activation of a temporary non-native mode (block 310). A temporary non-native mode may include presenting a segment of a program at an increased or decreased rate. A user may utilize a temporary non-native mode for short periods of time, for example, when certain portions of a program may be more or less important to the user than others. Similar to the persistent non-native mode, the temporary non-native mode may be activated through an on-screen menu or a dedicated button(s) on a remote control or other input device. However, the temporary non-native mode may include the option of not remaining active after the receiver (or other media presentation device) is turned off or when a program ends.

When a non-native mode is deemed active (either at block 304 or 310), the process 300 then determines the non-native rate (e.g., a setting, magnitude, or value selected by a user) (block 412). Such a rate may be a value selected in advance of activation (e.g., as a system setting via an on-screen menu) or in combination with the activation of the non-native rate (i.e., the value of the non-native rate may be selected at the same time of its activation). As described above, the non-native rate may be an increased or decreased rate relative to the native rate. The media presentation system may include limitations on the range of possible non-native rates. For example, the user may select a non-native rate among a plurality of predetermined choices. In another example, the user may enter a non-native rate within a predetermined range. On the other hand, the media presentation system may not include limitations on the non-native rate and/or the system may provide suggestions or guidelines for an appropriate non-native rate.

Once the value of the non-native rate is determined, the process 300 presents the audiovisual content at the non-native rate (block 314), as discussed further below. When presenting content at a non-native rate, the correspondence between the video content and audio content is maintained to enable a user (e.g., a person viewing the content) to perceive the content as though it were being presented at a native (i.e., intended) rate. Furthermore, as described below, the presentation of the audio content may be pitch-corrected to eliminate any pitch irregularities created by the increase or decrease in audio presentation rate. The content may be presented at the non-native rate until interrupted, for example, by the end of the program (block 316). If the program ends (e.g., is terminated by the user or the entire content is presented) the process 300 is over (block 317). The program may also be interrupted by the deactivation of the non-native mode (e.g., by pressing a button(s) on a remote control to terminate a temporary non-native mode or a persistent non-native mode) (block 318). If the program is interrupted by such a deactivation the process 300 presents the content at the native rate (block 306).

The example process 300 described above is only one example among many possible methods of operation to implement a non-native rate of play mode. The operations described above may be reordered, rearranged, performed simultaneously, or combined with additional and/or alternative operations to achieve the methods and apparatus described herein. Furthermore, the process 300 and its equivalents may be performed on any type of recording, including data stored on a long term storage device (e.g., the storage device 225 of FIG. 2) or data that is temporarily stored or cached (e.g., the last 30 minutes of live programming).

Figure 4:
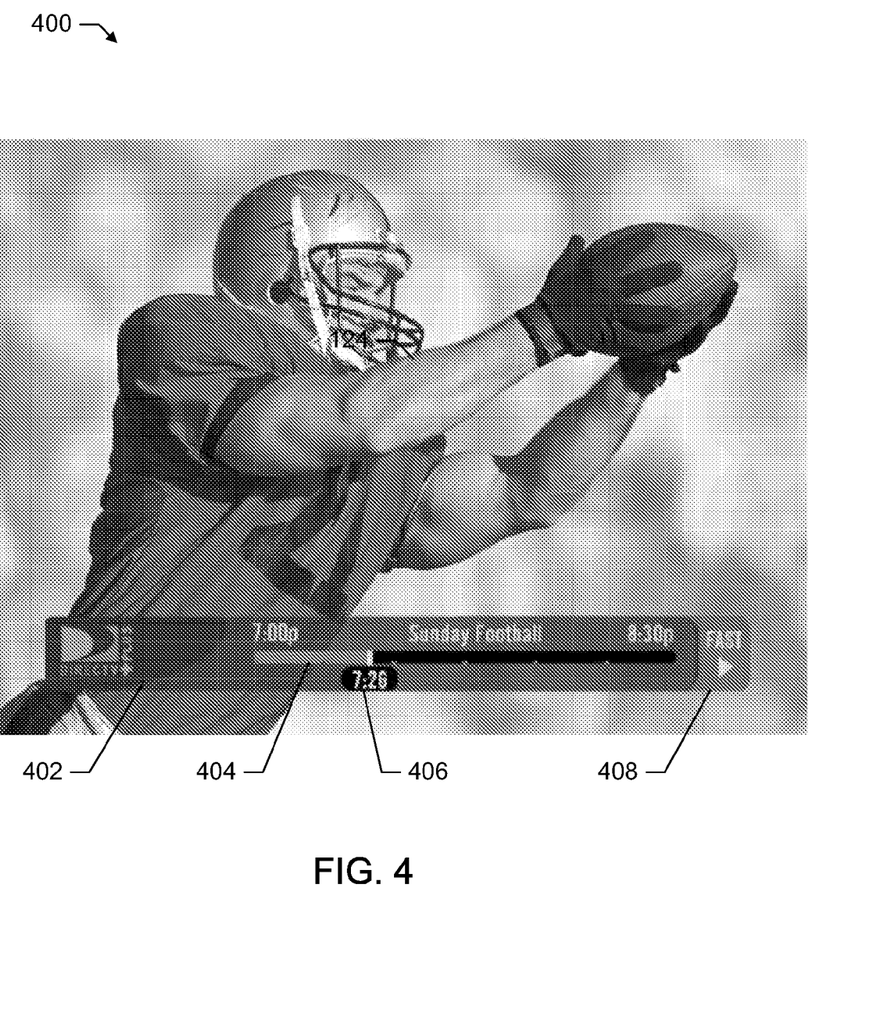
FIG. 4 is a screenshot including an example indication of a status of a non-native rate of play mode.

FIG. 4 depicts a screenshot 400 including example indications of the status of a media presentation system (e.g., the media presentation system of FIGS. 1 and 2). A main graphic 402 may be displayed upon the engagement of a designated button or any button on a remote control or other input device. The main graphic 402 may include a time indication 404 to inform a user of a current position 406 within a recorded or live program. The current position 406 may be manipulated through fast forwarding, rewinding, pausing, etc., which may all be indicated with similar graphics (not shown). Furthermore, different modes of operation (e.g., a non-native rate of play mode) may be indicated through similar graphics. For example, if an increased non-native rate of play mode is active, a graphic 408 may be displayed along with the main graphic 402 upon the pressing of a dedicated or any button on a remote control. A similar (but opposite in direction) graphic may be displayed when a decreased non-native rate of play mode is active. Further, the type of non-native mode (e.g., persistent or temporary) may be indicated with similar graphics (e.g., text including the name or title of the non-native mode).

Figure 5A:
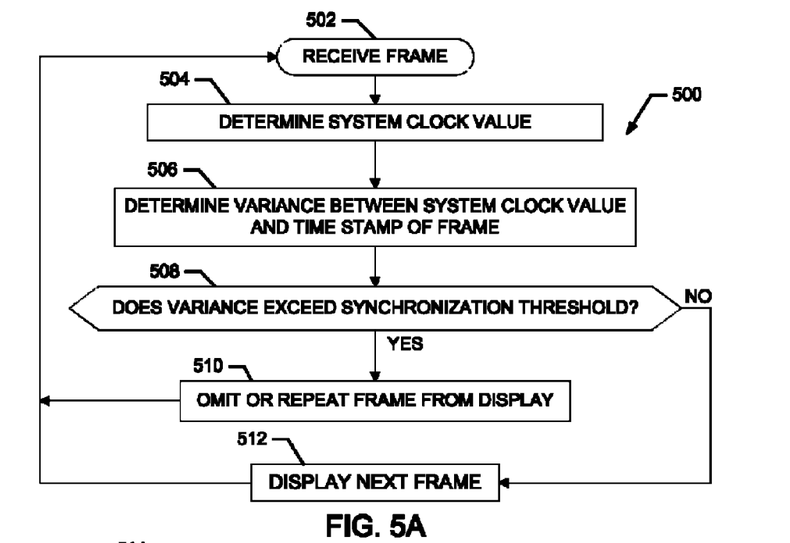
FIG. 5A is a flowchart representing a process to implement a non-native video presentation mode.

FIG. 5A is a flowchart representing an example process 500 that may be used by an example media presentation system (e.g., via the playback controller 245 of FIG. 2) to implement a non-native video display rate. Generally, the process 500 achieves the non-native rate of video display by omitting or repeating frames during a presentation of content. As a series of video frames is displayed, one or more frames may be dropped or repeated from the output (e.g., not sent or sent multiple times to the display device 220), causing the content to be viewed at a higher or lower rate, respectively. However, because only a small number of frames are dropped or repeated, the alteration of the display rate is substantially unperceivable to an audience.

To perform the omission or repetition of the frames, the process 500 may utilize an interaction between a system time clock and an example video synchronization operation, method, or algorithm. The video synchronization operation ensures that video data is not being presented too early or too late by comparing the system clock with a presentation time stamp, which is data sent with the video frame (e.g., in a header) to indicate a time when the frame should be displayed. In response to the comparison, the video synchronization operation may affect which frames are displayed, omitted, or repeated.

More specifically, the process 500 receives a frame, which includes a presentation time stamp (block 502). The process 500 also determines the system clock value (block 504), which may be manipulated or altered, as discussed further below. The process 500 compares the presentation time stamp of the frame and the system clock value to obtain a variance (block 506), which is then compared to a predetermined threshold (e.g., 20.00 ms) (block 508). If the variance meets or exceeds the threshold (i.e., a correction window), one or more frames may be omitted or repeated (block 510). If the variance is within the threshold, the frames are displayed in the original sequence (block 512). Thus, by manipulating (e.g., increasing or decreasing) the system clock value used in the video synchronization operation, the process 500 may cause a number of frames (e.g., one of every 5) to be dropped or repeated, thereby slightly increasing or decreasing the rate of video display.

Figure 5B:
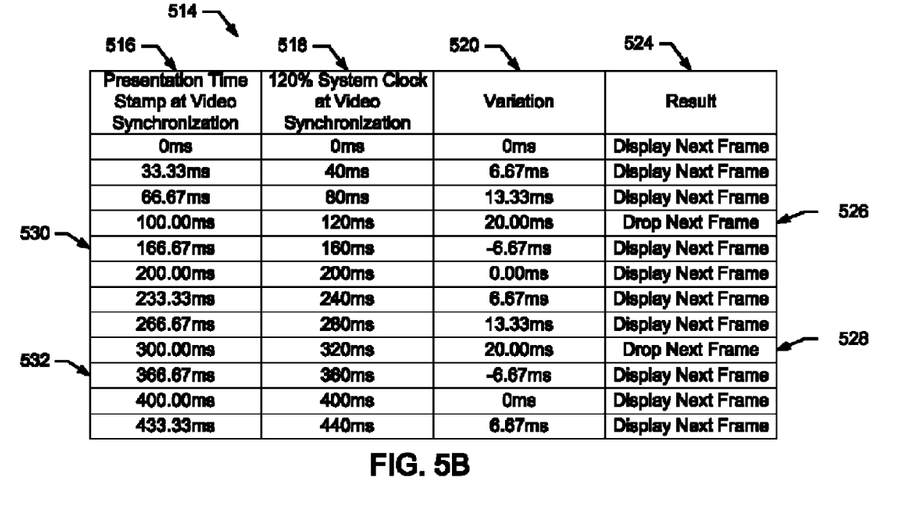
FIG. 5B represents an example presentation sequence of an increased non-native rate of play mode.

FIG. 5B illustrates an example sequence 514 of an example video presentation utilizing the process 500 of FIG. 5A to present video content at an increased non-native rate of 36 frames per second. In this example, a video synchronization operation is performed every 33.33 ms (as shown in column 516) and each row of the sequence 514 represents a frame and the corresponding video synchronization operation. To present video at a non-native rate of 36 frames per second, the process 500 performs the video synchronization comparison with an increased system clock value (120 percent of 30 frames per second). Therefore, as shown in column 518, the system clock value increases 40 ms (i.e., 33.33*1.2) during the 33.33 ms between video synchronization operations. Thus, unlike in a native rate sequence (e.g., 30 frames per second), a notable variation results when the system clock value is compared to the presentation time stamp of the current frame. If the variation (shown in column 520) meets or exceeds a threshold, the next frame is dropped (as shown in column 524). In the example of FIG. 5B, for illustrative purposes, the threshold is set at 20.00 ms. Therefore, as shown at rows 526 and 528, because the variation meets or exceeds the 20.00 ms threshold, the next frame is dropped. Accordingly, the value of the presentation time stamp at row 530 and 532 corresponds to non-successive frames. As frames are dropped, effectively increasing the rate of display, a set of video data may be presented in a shorter time period (i.e., at an increased non-native rate).

Figure 5C:
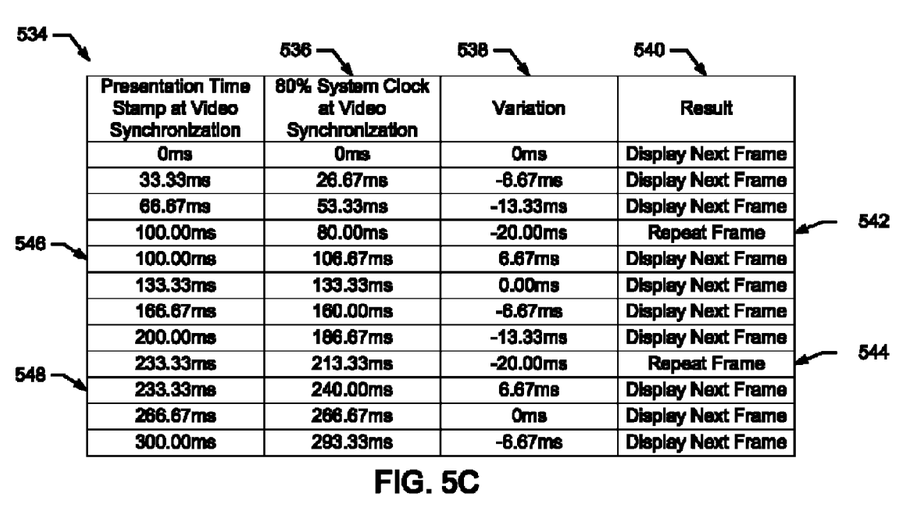
FIG. 5C represents an example presentation sequence of a decreased non-native rate of play mode.

FIG. 5C illustrates an example sequence 534 of a video frame presentation using the process 500 of FIG. 5A to present video content at a decreased non-native rate of 24 frames per second (80 percent of 30 frames per second). Similar to the sequence 514 of FIG. 5B, the sequence 534 of FIG. 5C results from a manipulation of the system clock value. However, in this example, the process 500 performs the video synchronization comparison with a decreased system clock value, thereby causing the process 500 to repeat the display of certain frames. As shown in column 536, the system clock value increases 26.67 ms (i.e., 33.33*0.8) during the 33.33 ms between video synchronization operations. If the variation (shown in column 538) meets or exceeds a threshold, the frame is repeated (as shown in column 540). In the example of FIG. 5C, for illustrative purposes, the threshold is set at 20.00 ms. Therefore, as shown at rows 542 and 544, because the variation meets or exceeds the 20.00 ms threshold, the frame is repeated. Accordingly, the value of the presentation time stamp at rows 546 and 548 correspond to non-successive frames. As frames are repeated, effectively decreasing the rate of display, a set of video data may be presented in a longer time period (i.e., at an decreased non-native rate).

The values shown and described in connection with FIGS. 5A, 5B, and 5C may vary and have been described for purposes of illustration. For example, the non-native rate may alternatively be any one of 26, 28, 32, or 34 frames per second. Further, the variance threshold may be an alternative value to correspond to more or less frequent frame omissions or repetitions. Further, the sequences 514 and 534 are merely examples. For example, sequence 534 may alternatively repeat the current frame instead of the next frame.

During a non-native rate of play mode, the audio portion may be synchronized with the video content and pitch-corrected to correspond to the native pitch of the content (i.e., the pitch at which the content was intended to be presented). The pitch correction avoids any irregularities that result from an increase or decrease in play rate. For example, presenting a fixed amount of audio data in a shorter time period than intended inherently includes a frequency increase, which leads to a change in pitch. To avoid pitch irregularities (e.g., the "chipmunk effect"), a media presentation system (e.g., the playback controller 245 of FIG. 2) may output audio data at substantially the same frequency at which it was received (i.e., as an input), despite the non-native rate at which it is played. A sampling rate of the audio data may be manipulated to make the adjustment. For example, a 48 kilohertz (kHz) audio stream played for one second at 120 percent speed (e.g., to synchronize the audio with video displayed at 120 percent) will generate 57,600 samples. However, the system may reduce the number of samples to 48,000 to match the input frequency. In doing so, the system allows the clock frequency of the outputs (e.g., PCM or SPDIF) to remain the same between native and non-native modes.

Further, similar to the video frames described above, audio frames include presentation time stamps. The audio/video synchronization may, for example, utilize the presentation time stamps to present the audio content at an increased or decreased non-native rate to correspond to the non-native rate of the video content. As described above in connection with FIGS. 5B and 5C, a variance (columns 520 and 538) between a presentation time stamp and the system clock may be calculated. To synchronize the content, the system may adjust the presentation time stamps of the audio frames based on the calculated variance, thereby increasing or decreasing the audio presentation accordingly.

The sample rate manipulation described above may cause a discrepancy in the association between the presentation time stamp of a frame and a system clock reading when the frame is presented after a sample reduction or increase. The media presentation system may perform an interpolation operation on the audio data to compensate for the discrepancy. For example, where an audio frame includes 1152 samples and is played at 120 percent, 960.0 samples (i.e., 1152/1.2) will be produced after the sample rate reduction. However, when the same audio frame played at 125 percent, 921.6 will be produced after the sample rate reduction. Therefore, an interpolation may be performed to fit the data to 921, 922, or some other approximate number of samples to compensate for the imprecise result of the sample rate reduction.

Additionally, system may include a clock recovery process to avoid undesired corrective action due to a non-native rate of presentation. A decrease or increase in audio samples results in a faster or slower play rate, respectively. For example, 2304 samples between two presentation time stamps, played at 48 kHz, represent 48 ms. After the sample rate manipulation described above for 120 percent presentation, 1920 samples are produced, which, at 48 kHz, represent 40 ms. A synchronization algorithm comparing a presentation time stamp and a system clock may determine that the audio data at 40 ms has arrived early, leading to an undesired corrective action (e.g., omission of data). Therefore, the system may include a function that returns an increased or decreased system clock value to the synchronization algorithm. In other words, the system may provide a faster or slower version of the system clock to a synchronization algorithm to prevent unwanted corrective actions.

Figure 6:
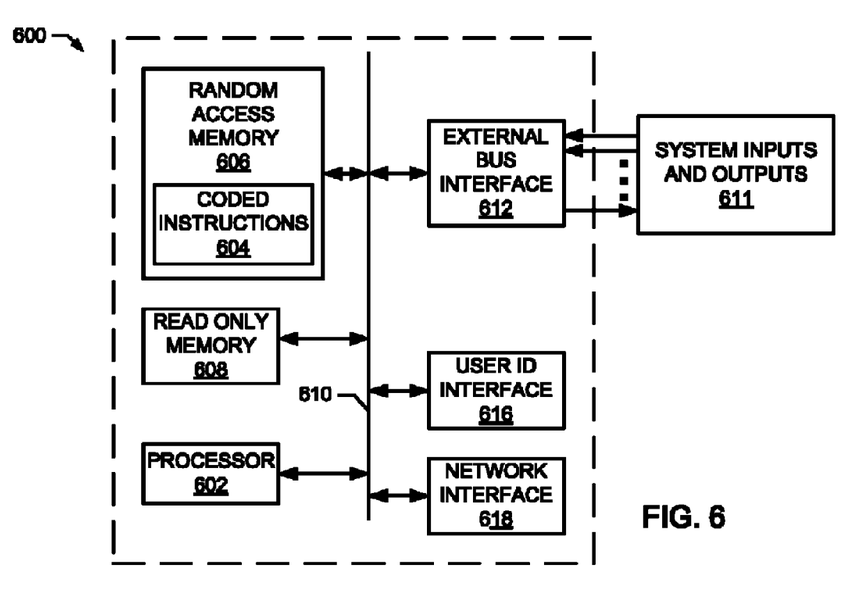
FIG. 6 illustrates an example manner of implementing an example processor unit.

FIG. 6 is a schematic diagram of an example manner of implementing an example processor unit 600 to execute the example methods and apparatus described herein. The example processor unit 600 of FIG. 6 includes a general purpose programmable processor 602. The example processor 602 may execute, among other things, machine accessible instructions 604 (e.g., instructions present within a random access memory (RAM) 606 as illustrated and/or within a read only memory (ROM) 608) to perform the example process 300 of FIG. 3 and/or other processes described herein. The example processor 602 may be any type of processing unit, such as a microprocessor from the Intel® Pentium® family of microprocessors, the Intel® Itanium® family of microprocessors, and/or the Intel XScale® family of processors. The processor 602 may include on-board analog-to-digital (A/D) and digital-to-analog (D/A) converters.

The processor 602 may be coupled to an interface, such as a bus 610 to which other components may be interfaced. The example RAM 606 may be implemented by dynamic random access memory (DRAM), Synchronous DRAM (SDRAM), and/or any other type of RAM device, and the example ROM 608 may be implemented by flash memory and/or any other desired type of memory device. Access to the example memories 608 and 606 may be controlled by a memory controller (not shown) in a conventional manner.

To send and/or receive system inputs and/or outputs, the example processor unit 600 includes any variety of conventional interface circuitry such as, for example, an external bus interface 612. For example, the external bus interface 612 may provide one input signal path (e.g., a semiconductor package pin) for each system input. Additionally or alternatively, the external bus interface 612 may implement any variety of time multiplexed interface to receive output signals via fewer input signals.

To allow the example processor unit 600 to interact with a remote server, the example processor unit 600 may include any variety of network interfaces 618 such as, for example, an Ethernet card, a wireless network card, a modem, or any other network interface suitable to connect the processor unit 600 to a network. The network to which the processor unit 600 is connected may be, for example, a local area network (LAN), a wide area network (WAN), the Internet, or any other network. For example, the network could be a home network, an intranet located in a place of business, a closed network linking various locations of a business, or the Internet.

Although an example processor unit 600 has been illustrated in FIG. 6, processor units may be implemented using any of a variety of other and/or additional devices, components, circuits, modules, etc. Further, the devices, components, circuits, modules, elements, etc. illustrated in FIG. 6 may be combined, re-arranged, eliminated and/or implemented in any of a variety of ways.

The apparatus and methods described above are non-limiting examples. Although the example apparatus and methods described herein include, among other components, software executed on hardware, such apparatus and methods are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

Although certain example methods and apparatus have been described herein, the scope of coverage of this patent is not limited thereto. On the contrary, this patent covers all methods and apparatus fairly falling within the scope of the appended claims either literally or under the doctrine of equivalents.

What is claimed is:

1. A method of presenting audiovisual content comprising:
outputting a first frame of audiovisual content according to a native rate defined by a system clock associated with processing of the audiovisual content;
generating a modified value of the system clock for a non-native rate of play mode to be initiated by a user via a selection from a user interface;
comparing a time stamp of a second frame of the audiovisual content to the modified value of the system clock at a first interval;
comparing a difference between the modified value of the system clock and the time stamp to a threshold, the threshold being a set amount of time assigned to the threshold prior to the initiation of the non-native rate of play mode via the selection from the user interface; and
when the difference is greater than the threshold, omitting a third frame or repeating the second frame of the audiovisual content.

2. A method as defined in claim 1, wherein the third frame is omitted when the non-native rate of play mode corresponds to an increased rate relative to the native rate.

3. A method as defined in claim 1, wherein the second frame is repeated when the non-native rate of play mode corresponds to a decreased rate relative to the native rate.

4. A method as defined in claim 1, wherein the second frame follows the first frame in a sequence of frames defining the audiovisual content.

5. A method as defined in claim 1, wherein the first interval corresponds to an amount of time at which a synchronization operation is to be executed.

6. A method as defined in claim 1, further comprising pitch-correcting an audio portion of the audiovisual content such that a first presentation of the audiovisual content at a non-native rate corresponding to the non-native rate of play mode and a second presentation of the audiovisual content at the native rate are substantially indistinguishable to an audience member.

7. A method as defined in claim 6, wherein the pitch-correcting includes manipulating a sampling rate of the audio portion of the audiovisual content.

8. A method as defined in claim 1, further comprising activating or deactivating the non-native rate of play mode in response to a completion of a presentation of the audiovisual content.

9. A method as defined in claim 8, wherein the non-native rate of play mode is a persistent mode.

10. A method as defined in claim 8, wherein the non-native rate of play mode is a temporary mode.

11. An apparatus for presenting audiovisual content comprising:
   a receiver to receive audiovisual content and to output a first frame of the audiovisual content according to a native rate defined by a system clock associated with the output of the audiovisual content;
   a comparator to, in response to a user initiating a user-selectable non-native rate of play mode:
      compare a time stamp of a second frame of the audiovisual content to a modified value of the system clock at a first interval, wherein the modified value of the system clock is based on a current value of the system clock; and
      compare a difference between the time stamp and the modified value of the system clock to a threshold, the threshold being a static amount of time that remains constant across multiple intervals of the non-native rate of play mode; and
   a controller to omit a third frame or repeat the second frame of the audiovisual content when the difference is greater than the threshold.

12. An apparatus as defined in claim 11, wherein the third frame is omitted when the non-native rate of play mode corresponds to an increased rate relative to the native rate.

13. An apparatus as defined in claim 11, wherein the second frame is repeated when the non-native rate of play mode corresponds to a decreased rate relative to the native rate.

14. An apparatus as defined in claim 11, wherein the first interval corresponds to an amount of time at which a synchronization operation is to be executed.

15. An apparatus as defined in claim 11, further comprising a controller to pitch-correct an audio portion of the audiovisual content such that a first presentation of the audiovisual content at a non-native rate corresponding to the non-native rate of play mode and a second presentation of the audiovisual content at the native rate are substantially indistinguishable to an audience member.

16. An apparatus as defined in claim 15, wherein the pitch correction includes manipulating a sampling rate of the audio portion of the audiovisual content.

17. An apparatus as defined in claim 11, further comprising an interface to communicate with an input device to enable the user to activate or deactivate the non-native rate of play mode.

18. An apparatus as defined in claim 17, further comprising a user interface to facilitate an activation or deactivation of the non-native rate of play mode.

19. An apparatus as defined in claim 18, wherein the user interface includes a guide on a display device to be manipulated via the input device.

20. An apparatus as defined in claim 18, wherein the user interface includes an indication regarding a status of the non-native rate of play mode.

21. A media presentation system comprising:
   a transmission system to generate and to transmit a stream of audiovisual content;
   a receiver to receive the stream of audiovisual content and to generate video and audio output signals in accordance with a system clock associated with an output device to output the video and audio output signals; and
   a means for presenting the audiovisual content at a non-native rate by comparing a first time stamp of a first frame of the audiovisual content with a modified value of the system clock at a first interval, comparing a difference between the first time stamp and the modified value of the system clock to a threshold, and when the difference is greater than the threshold, omitting a second frame of the audiovisual content at the output device, wherein the threshold is a a static amount of time that remains constant across multiple intervals of a non-native rate of play mode corresponding to the non-native rate.

22. A media presentation system as defined in claim 21, wherein the first interval corresponds to an amount of time at which a synchronization operation is to be executed.

23. A media presentation system as defined in claim 21, wherein a user of the receiver can define the non-native rate to persistent through a piece of programming and to cease when the piece of programming ends.

24. A media presentation system of claim 21, further comprising a controller to correct a pitch of the audio output signal to substantially match a pitch of an audio input signal received by the receiver.

25. A media presentation system of claim 24, wherein the controller is to manipulate a sampling rate to synchronize the audio and video output signals.

* * * * *